E. W. HARRIMAN.
REVERSIBLE GEARING.
APPLICATION FILED SEPT. 7, 1911.
1,057,641.
Patented Apr. 1, 1913.
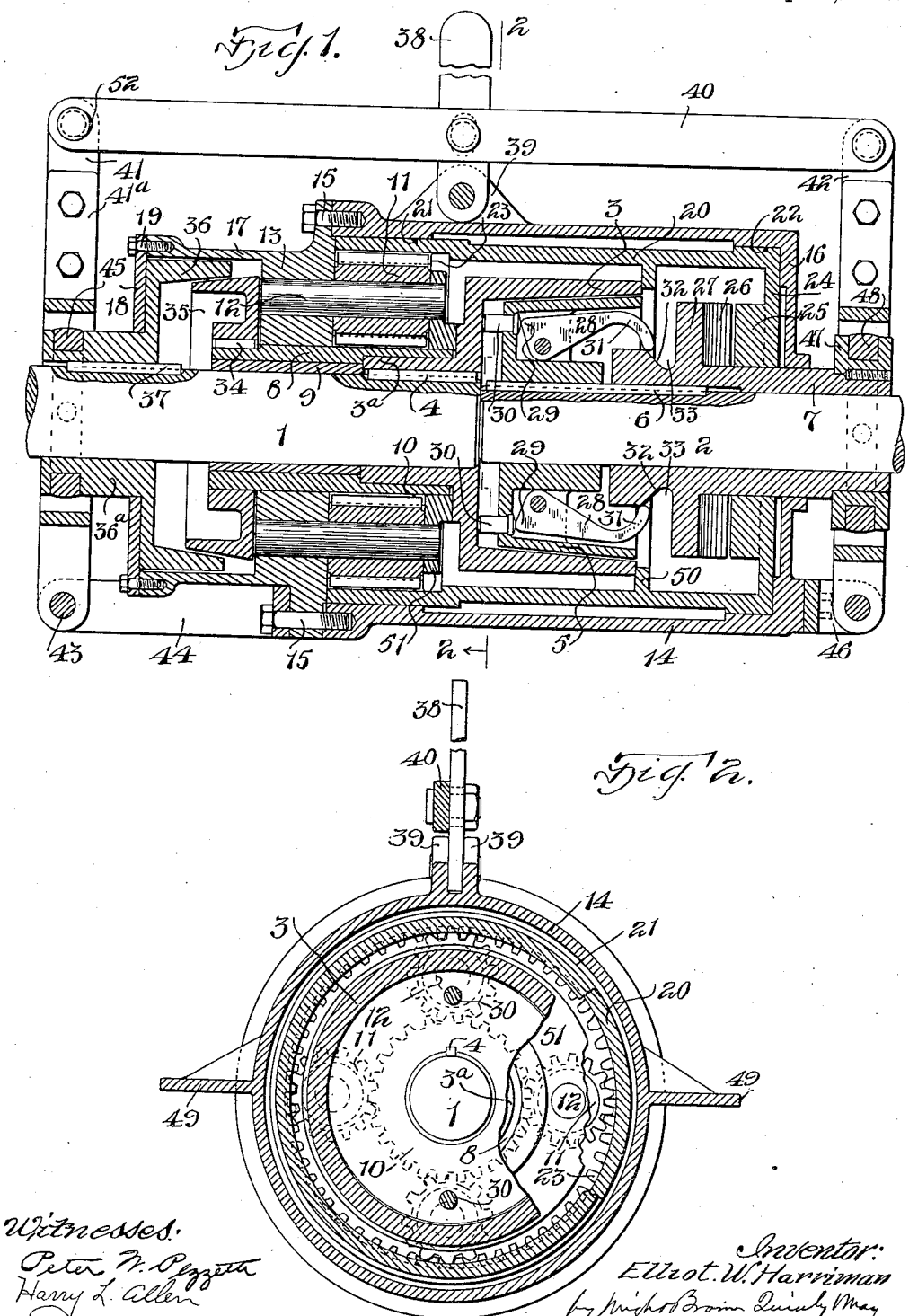

UNITED STATES PATENT OFFICE.

ELLIOT W. HARRIMAN, OF TAUNTON, MASSACHUSETTS.

REVERSIBLE GEARING.

1,057,641. Specification of Letters Patent. Patented Apr. 1, 1913.

Application filed September 7, 1911. Serial No. 648,136.

*To all whom it may concern:*

Be it known that I, ELLIOT W. HARRIMAN, of Taunton, in the county of Bristol and State of Massachusetts, have invented certain new and useful Improvements in Reversible Gearing, of which the following is a specification.

This invention relates to gearing adapted to transmit motion from one shaft to another in opposite directions, and at respectively different speeds, or at the same speed, if desired.

The principal objects of the invention are first to provide an incased gearing for this purpose, of which the casing is permanently fixed and requires no brake; second to construct a gearing capable of transmitting large powers and being at the same time not excessively great in diameter; and third, to simplify the construction and make an efficient gearing having relatively few strong and easily constructed parts.

In the accompanying drawing forming part of this application, Figure 1 is a longitudinal section of the clutch embodying my invention. Fig. 2 is a cross section of the same on line 2—2 of Fig. 1.

The same reference characters indicate the same parts in all the figures.

Referring to the drawings, 1 and 2 represent two shaft sections in alinement, such as the independent driving shaft and tail shaft of a motor boat, or the driving and driven shafts of any other mechanical combination. Either of the shaft sections may be considered as the driving shaft, and the other as the driven shaft. For convenience of description, however, the shaft 1 will be considered the driving shaft. On the driving shaft is mounted a clutch head 3 which is secured against relative rotation by a key 4, and on the driven shaft is mounted a complemental clutch member 5 adapted to slide on the shaft, but prevented from rotating relatively thereto by means of a spline 6. The clutch members 3 and 5 have complemental engaging surfaces formed with a relatively fine taper. Also mounted slidingly upon the shaft 2 and prevented from rotating thereon by the spline 6 is a sleeve 7, one of the functions of which is to force the clutch member 5 into contact with the clutch head 3 and to disengage it therefrom, as will be hereinafter described.

A sleeve 8 is journaled loosely on the driving shaft and contains a bushing 9. A part of the sleeve is formed to have a bearing on the hub 3ª of the clutch head 3. Externally the sleeve 8 is formed in part as a gear 10 having spur teeth. This gear meshes with the teeth of pinions 11, of which there may be one, two, four, or more, each rotatably mounted upon a stud 12 which is secured at one end in a plate or disk 13. Said disk surrounds the sleeve 8 and constitutes part of the casing of the gearing. The balance of the casing consists of a shell 14 detachably secured to the rim of the disk 13 by bolts 15 or otherwise, and having a head 16 forming one end of the case, a shell portion 17 projecting from the opposite side of the plate 13, and a head 18 secured to the shell portion 17 by screws 19. The head 16 surrounds and fits closely about the sleeve 7.

Inside of the shell 14 is a sleeve or hollow cylinder 20 having external bearings at 21 and 22 on the interior of the casing shell, and surrounding the pinions 11 at one end. On the inside of that end of said hollow cylinder which surrounds the pinions 11 are formed teeth 23 which constitute an internal gear. On the opposite end of the hollow cylinder is a head or web 24 having axially offset teeth 25 forming one part of a face clutch. The complemental part of such clutch is formed by oppositely arranged teeth 26 on a disk 27 united with the sleeve 7 already described.

Adjacent to the sleeve 7 and connected to the clutch member 5 are cam levers 28 of which the short arms or cam portions 29 engage pins 30 passing through the end of the clutch member and bearing against the bottom of the clutch head 3. The long arms 31 of these cam levers form fingers which are curved toward the axis and engage a cam lip 32 formed on the end of the sleeve. The latter has depressions or recesses 33 beside such cam lip, the surfaces of which merge into the inclined cam surface of the cam lip.

Secured by a key 34 to the sleeve 8 is another clutch member 35 which coacts with a complemental clutch head 36 splined to the driving shaft 1 by means of a feather 37. The hub of this clutch head passes through the casing head 18 which surrounds such hub with a close fit.

An operating lever 38 is pivoted between ears 39 on the top of the case, and is connected by means of a link or bar 40 with levers 41 and 42 at opposite ends of the case. The lever 41 is pivoted at 43 to a bracket 44 secured to the case, and is offset between its ends to pass around the hub 36ᵃ of the clutch 36. A complemental member 41ᵃ is also pivoted on the stud 43, passes around the opposite side of the hub 36ᵃ and is bolted at its upper end to the lever 41. A U-shaped member 45 forming half of a strap or collar lies in a groove in the hub 36ᵃ and has pins engaged in the lever members 41 and 41ᵃ so that an engagement is effected between this lever and the clutch head 36, permitting the latter to rotate, and at the same time to be moved axially. The lever 42 is similarly formed of two members, both pivoted upon a bracket 46 and spread apart to embrace a grooved head 47 rigidly secured to the sleeve 7. A U-shaped strap member 48 similarly connects the sleeve 7 with the lever 42.

The case has on its exterior at opposite sides brackets 49 by which it may be secured fast to any sort of frame, such as the bed plate of an engine or the bottom of a boat. The disk 13 and casing head 16 confine the hollow cylinder 20 against endwise movement, and the latter has an internal rib 50 engaging the clutch head 3 and preventing the latter from endwise movement. The outer ends of the studs 12 which carry the pinions 11 are supported and made firm by a spider 51 having a bearing on the sleeve 8.

As the gearing is illustrated in the drawings, it is in neutral position. For coupling the shafts to drive ahead, or in other words to drive both in the same direction, the control lever 38 is moved to the left. This causes the lever 42 to move sleeve 7 inward, which latter contacts with the hub of clutch 5 and forces it into contact with the clutch head 3. At the same time the cam levers 28 are crowded against the pins 30 and their finger ends caused to dip into the recesses 33. As the surfaces of the clutch members 3 and 5 are long and the taper is comparatively slight, they grip tightly and thus enable large powers to be transmitted without slipping. It will be seen that the drive from shaft 1 to shaft 2 is direct, through the key 4, clutch head 3, clutch 5 and feather 6.

For reversing the driven shaft the control lever is moved toward the right. The first effect of this movement is to move the sleeve 7 to the right, causing the cam surface 32 thereof to drive the cam levers outwardly, forcing their cam projections against the pins 30 and so disengaging clutch member 5 from clutch head 3. The pins are carried in the clutch member 5 and engage loosely with the clutch head. This is one of the principal features of the invention because by it disengagement of the forward driving clutch is assured before the backing clutch can be thrown in. Without such a disengaging device there would be liability of the clutch members 3 and 5 sticking together unless they were made so blunt as to require the expenditure of power in holding them together, and to make slipping liable to occur. My improvement enables the clutch to be at the same time relatively small and capable of carrying large powers, and insures disengagement when necessary. The next effect produced is to cause engagement of the positive clutch members 25, 26, thus connecting the hollow cylinder 20 with its internal gear 23 to the driving shaft. Finally the shipper lever 41 crowds the clutch head 36 into contact with the clutch member 35, which latter drives the sleeve 8 with its gear teeth 10, the pinions 11 and the internal gear 23. Thereby the driven shaft is rotated reversely at reduced speed.

Lost motion is provided between the clutch shipper 41 and the bar 40 at 52. The purpose of this lost motion is to insure coupling of the positive clutch members before the friction clutch members 35, 36 are coupled. This is to prevent sudden application of the power through the positive clutch, and a consequent danger of stripping the teeth of such clutch.

The casing is supplied with oil to an extent sufficient to enable all the moving parts to run in oil and to be sufficiently lubricated. As the case is stationary it has no tendency to throw oil, and it can be most easily set up so tightly as to prevent leakage of oil. If any oil should leak around the sleeve 7 or the hub 36ᵃ, or through such sleeve and hub about the shafts, there would be little tendency to throw the oil because the diameters and linear velocities of these surfaces are so low. However, if desired it would be a simple matter to apply stuffing boxes if leakage should occur at the points noted. The provision of such stuffing boxes would not be a departure from my invention.

I claim,—

1. A reversing gearing comprising in combination a driving shaft, a driven shaft, complemental friction clutch members non-rotatably engaged with said shaft sections, respectively, and adapted to be interengaged for direct driving, reverse driving gearing, including a spur gear loose on one of the shafts, an internal gear surrounding the spur gear, and an intermediate pinion, a clutch arranged to connect one of the gears of said reverse driving gearing to one of the shaft sections, and a clutch arranged to connect the other gear of said gearing to the other shaft section.

2. A reversing gearing comprising in combination a driving shaft, a driven shaft, complemental friction clutch members non-rotatably engaged with said shaft sections, respectively, and adapted to be interengaged for direct driving, reverse driving gearing, including a spur gear loose on one of the shafts, an internal gear surrounding the spur gear, and an intermediate pinion, a friction clutch arranged to connect said reverse driving gearing to one of the shaft sections, a positive clutch arranged to connect said gearing to the other shaft section, and operating mechanism for the two last named clutches engaged therewith and operable to connect and disconnect both, said mechanism having a lost motion connection with the last named friction clutch, whereby to connect the positive clutch slightly in advance of connection of the friction clutch.

3. A reversing gearing comprising in combination a driving shaft, a driven shaft, complemental friction clutch members non-rotatably engaged with said shaft sections, respectively, and adapted to be interengaged for direct driving, reverse driving gearing, a friction clutch arranged to connect said reverse driving gearing to one of the shaft sections, a positive clutch arranged to connect said gearing to the other shaft section, and cam levers associated with and operated by one of the two last named clutches for disconnecting the first named clutch when the last named clutches are connected.

4. A driving and reversing mechanism, comprising a driving shaft, a clutch member secured to said shaft, a second clutch member splined thereto, a gear mounted rotatably upon the shaft, a complemental clutch member secured to said gear and adapted to coöperate with the second-named clutch member, a stationary pinion meshing with said gear, an internal gear meshing with such stationary pinion, a positive clutch member connected with said internal gear, a second shaft, a positive clutch member engaged with the second shaft and adapted to coöperate with the first named positive clutch member, and a friction clutch member movably mounted on the shaft and adapted to coöperate with the first-named clutch member.

5. In a driving and reversing mechanism, a shaft 1, a clutch head 3 secured thereon, a shaft 2, a clutch member 5 movably mounted thereon and adapted to co-act with the clutch head, a sleeve splined on the shaft 2 and having a positive clutch member 26, a complemental positive clutch member 25, an internal gear 23 associated with the clutch member 25, a gear 10 loosely mounted on the shaft 1, an intermediate gear 11 engaged with the gear 10 and the internal gear 23, and means such as clutch members 35 and 36 for releasably securing the gear 10 on the shaft 1, substantially as described.

6. A driving and reversing mechanism comprising in combination with a driving and a driven shaft, complemental friction clutch members connected to said shaft sections, respectively, and having finely tapered engaging surfaces, one of said members being splined to the shaft section with which it is engaged in order to move into and out of engagement with the other clutch member, a clutch member for reversed driving mounted slidingly and non-rotatably close to the aforesaid sliding clutch member upon the same shaft section, a complemental reversely rotating clutch member, means driven by the other shaft section for rotating the latter clutch member oppositely to said shaft section, means for moving the first named reverse drive clutch member into and out of engagement with the complemental clutch member, and means including a multiplying lever operated thereby when said member is moved into connected position for forcibly separating the friction clutch members.

7. In a gearing of the sort described, in combination with separate shaft sections, a friction clutch member mounted upon one of said sections, a complemental friction clutch member mounted non-rotatably on the other section and movable longitudinally into and out of engagement with the first clutch member, said members having finely tapered complemental conical surfaces, a reverse driving clutch member splined upon the same shaft section with the first named sliding clutch member and adjacent thereto, means for moving the same in opposite directions, mechanism driven by the other shaft section and engageable with the reverse clutch member for driving the latter in the reversing direction, said reverse clutch member having a portion adapted to engage the sliding conical clutch member and move the same into driving connection when moved in one direction, and having a cam portion, levers pivoted to the sliding friction clutch member having fingers engageable with such cam portion and having short arms or cam protuberances, and studs carried by said member movable relatively thereto in the direction of movement thereof and bearing on the complemental friction clutch member, said levers being so arranged that when the reverse clutch member is moved away from the conical member, the levers are so moved as to press on the studs and move the sliding conical clutch member forcibly out of contact with the complemental member.

8. In a mechanism of the character described the combination with the shaft members 1 and 2 of a conical clutch member 3 on the shaft 1, a complemental clutch member 5 splined to the shaft 2, said clutch members having finely tapered complemental conical engaging surfaces, a reversing clutch member 27 splined to the shaft 2 and having a portion arranged close to the clutch member 5, whereby when moved in one direction it is adapted to engage and force the clutch member 5 into engagement with the clutch member 3, reversing gearing driven by the shaft member 1 and connectible with the member 27 for driving it reversely, said clutch member 27 having also a cam surface 32, a cam lever 28 having a long arm 31 engaging the cam surface 32 and a short arm 29, so arranged that when the clutch member 27 is moved away from clutch member 5 the short arm 29 is moved approximately longitudinally of the shaft, and means 30 for applying pressure of the arm 29 in the direction such as to cause forcible disengagement of the member 5 from the member 3.

In testimony whereof I have affixed my signature, in presence of two witnesses.

ELLIOT W. HARRIMAN.

Witnesses:
FREDERICK J. HENRY,
THOMAS F. KEIRNAN.

Copies of this patent may be obtained for five cents each, by addressing the "Commissioner of Patents. Washington, D. C."